(12) United States Patent
Arsenault et al.

(10) Patent No.: US 10,774,428 B2
(45) Date of Patent: Sep. 15, 2020

(54) METHOD FOR CORROSION INHIBITING ADDITIVE

(71) Applicant: United Technologies Corporation, Farmington, CT (US)

(72) Inventors: Sarah Arsenault, West Brookfield, MA (US); James T. Beals, West Hartford, CT (US); Mark R. Jaworowski, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 169 days.

(21) Appl. No.: 15/817,654

(22) Filed: Nov. 20, 2017

(65) Prior Publication Data

US 2018/0073152 A1    Mar. 15, 2018

Related U.S. Application Data

(60) Continuation of application No. 14/230,293, filed on Mar. 31, 2014, now abandoned, which is a division of application No. 11/768,955, filed on Jun. 27, 2007, now abandoned.

(51) Int. Cl.
| | |
|---|---|
| *C09D 5/12* | (2006.01) |
| *C23F 11/18* | (2006.01) |
| *C09D 5/08* | (2006.01) |
| *C23C 22/40* | (2006.01) |
| *C23C 22/73* | (2006.01) |
| *C23C 22/83* | (2006.01) |
| *C23F 11/12* | (2006.01) |

(52) U.S. Cl.
CPC ............. *C23F 11/185* (2013.01); *C09D 5/084* (2013.01); *C09D 5/12* (2013.01); *C23C 22/40* (2013.01); *C23C 22/73* (2013.01); *C23C 22/83* (2013.01); *C23F 11/12* (2013.01); *C23F 11/187* (2013.01); *Y10T 428/31678* (2015.04)

(58) Field of Classification Search
None
See application file for complete search history.

(56) References Cited

U.S. PATENT DOCUMENTS

| | | | |
|---|---|---|---|
| 2,387,528 | A | 10/1945 | Patterson |
| 2,430,589 | A | 11/1947 | Sloan |
| 2,902,394 | A | 9/1959 | Jeremias |
| 3,063,877 | A | 11/1962 | Schiffman |

(Continued)

FOREIGN PATENT DOCUMENTS

| | | |
|---|---|---|
| CA | 2491359 | 12/2003 |
| EP | 0429180 | 5/1991 |

(Continued)

OTHER PUBLICATIONS

European Search Report for European Patent Application No. 08252162.6 completed Jun. 26, 2009.

(Continued)

*Primary Examiner* — Daniel J. Schleis
(74) *Attorney, Agent, or Firm* — Carlson, Gaskey & Olds, P.C.

(57) ABSTRACT

A method of selecting a corrosion-inhibiting substance includes selecting a corrosion-inhibiting substance to include a non-tungstate anodic corrosion inhibitor with respect to an amount of zinc in an aluminum alloy substrate that is to be coated with the corrosion-inhibiting substance.

15 Claims, 1 Drawing Sheet

(56) References Cited

U.S. PATENT DOCUMENTS

| | | | |
|---|---|---|---|
| 3,279,958 | A | 10/1966 | Maurer |
| 4,138,353 | A | 2/1979 | Lipinski |
| 5,030,285 | A | 7/1991 | Vallvey |
| 5,130,052 | A | 7/1992 | Kreh |
| 5,266,611 | A | 11/1993 | Teschendorf |
| 5,806,327 | A | 9/1998 | Lord et al. |
| 5,871,839 | A | 2/1999 | Boyd et al. |
| 5,948,147 | A | 9/1999 | Sinko |
| 5,948,267 | A | 9/1999 | Whittemore et al. |
| 6,074,495 | A | 6/2000 | Sung et al. |
| 6,135,195 | A | 10/2000 | Lee et al. |
| 6,190,780 | B1 | 2/2001 | Shoji et al. |
| 6,537,678 | B1 | 3/2003 | Putnam |
| 6,582,530 | B1 | 6/2003 | Hanlon |
| 6,613,390 | B2 | 9/2003 | Jaworowski et al. |
| 6,648,986 | B1 | 11/2003 | Tang |
| 6,758,887 | B2 | 7/2004 | Bhatia |
| 6,941,770 | B1 | 9/2005 | Taras et al. |
| 2002/0110642 | A1 | 8/2002 | Jaworowski |
| 2003/0150525 | A1 | 8/2003 | Briles |
| 2003/0217787 | A1 | 11/2003 | Parkos |
| 2004/0256030 | A1 | 12/2004 | Tang |
| 2004/0262580 | A1 | 12/2004 | Yu |
| 2005/0179010 | A1 | 8/2005 | Lin |
| 2006/0113007 | A1 | 6/2006 | Morris |
| 2006/0247335 | A1 | 11/2006 | Bhaatia |
| 2007/0000560 | A1 | 1/2007 | Jaworowski |

FOREIGN PATENT DOCUMENTS

| | | |
|---|---|---|
| EP | 1191073 | 3/2002 |
| EP | 1493846 | 1/2005 |
| EP | 1493846 | 5/2005 |
| EP | 1717279 | 11/2006 |
| WO | 9923280 | 5/1999 |

OTHER PUBLICATIONS

Data Sheet. 7075 Alloy Data Sheet. 2006 Capital Aluminum Extrusions Limited. Retrieved Jul. 22, 2009 from: http://www.capalex.co.uk/7075_alloy.html.

Data Sheet. Aluminum 7075-T6, 7075-T651 1996-2004. Automation Creation, Inc. p. 1.

METHOD FOR CORROSION INHIBITING ADDITIVE

CROSS-REFERENCE TO RELATED APPLICATIONS

This application is a continuation of U.S. application Ser. No. 14/230,293 filed Mar. 31, 2014, which is a divisional of U.S. application Ser. No. 11/768,955 filed on Jun. 27, 2007.

BACKGROUND

This disclosure relates to corrosion inhibitors and, more particularly, to a corrosion inhibitor that is effective for use on aluminum alloys having relatively high amounts of zinc.

Components made from metallic alloys, such as aluminum alloys, achieve higher strengths through inclusion of alloying elements. However, the presence of these alloying elements tends to make the alloy vulnerable to corrosion. Typically, the component utilizes a protective coating containing a corrosion-inhibitor to protect the underlying alloy from corrosion.

One type of corrosion-inhibitor includes hexavalent chromium in the form of a barium or strontium chromate compound, for example. Although effective, hexavalent chromium is commonly recognized as a carcinogen and is therefore undesirable for use as a coating.

Chrome-free corrosion-inhibitors have been used as an alternative to hexavalent chromium inhibitors. For example, chrome-free corrosion inhibitors utilize anodic and cathodic corrosion inhibitors to resist corrosion of the underlying alloy. One drawback of existing chrome-free corrosion inhibitors is that they do not provide equal corrosion protection for all alloy compositions.

New compositions of aluminum alloys are being developed and are finding use in industries such as the aerospace industry. Although conventional corrosion inhibitors, such as EcoTuff®, have been effective in providing corrosion protection, an even greater degree of corrosion protection is desired. Accordingly, there is a need for a corrosion-inhibiting substance that provides enhanced corrosion protection of aluminum alloys.

SUMMARY

A method of selecting a corrosion-inhibiting substance according to a non-limiting example of this disclosure includes selecting a corrosion-inhibiting substance to include a non-tungstate anodic corrosion inhibitor with respect to an amount of zinc in an aluminum alloy substrate that is to be coated with the corrosion-inhibiting substance.

A further example according to the previous embodiment includes selecting the corrosion inhibiting substance to include the non-tungstate anodic corrosion inhibitor with respect to the amount of the zinc being between about 5.1 and 6.1 wt % of the aluminum alloy.

A further example according to any of the previous embodiments includes selecting the corrosion inhibiting substance also with respect to an amount of copper in the aluminum alloy substrate that is to be coated with the corrosion-inhibiting substance.

A further example according to any of the previous embodiments includes selecting the corrosion inhibiting substance to include the non-tungstate anodic corrosion inhibitor with respect to the amount of the copper being between 1.2 wt % and 2.0 wt %.

A further example according to any of the previous embodiments includes selecting the non-tungstate anodic corrosion inhibitor to include at least one of vanadium and molybdenum.

A further example according to any of the previous embodiments includes selecting the non-tungstate anodic corrosion inhibitor to include zinc molybdate.

A further example according to any of the previous embodiments includes selecting the corrosion inhibiting substance to include a cathodic corrosion inhibitor comprising at least one Group IIIB Periodic Table element.

A method of selecting a corrosion-inhibiting substance according to a non-limiting example of this disclosure includes selecting a corrosion-inhibiting substance to include a non-tungstate anodic corrosion inhibitor based upon an amount of at least one alloying element in an aluminum alloy substrate that is to be coated with the corrosion-inhibiting substance.

In a further example according to any of the previous embodiments, the at least one alloying element comprises zinc, and further includes selecting the corrosion inhibiting substance to include the non-tungstate anodic corrosion inhibitor based upon the amount of the zinc being greater than 0.25 wt % of the aluminum alloy.

In a further example according to any of the previous embodiments, the at least one alloying element comprises zinc, and further including selecting the corrosion inhibiting substance to include the non-tungstate anodic corrosion inhibitor based upon the amount of the zinc being between about 5.1 and 6.1 wt % of the aluminum alloy.

A further example according to any of the previous embodiments includes selecting the non-tungstate anodic corrosion inhibitor to include at least one of vanadium and molybdenum.

A further example according to any of the previous embodiments includes selecting the non-tungstate anodic corrosion inhibitor to include zinc molybdate.

A further example according to any of the previous embodiments includes selecting the corrosion inhibiting substance to include a cathodic corrosion inhibitor comprising at least one Group IIIB Periodic Table element.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
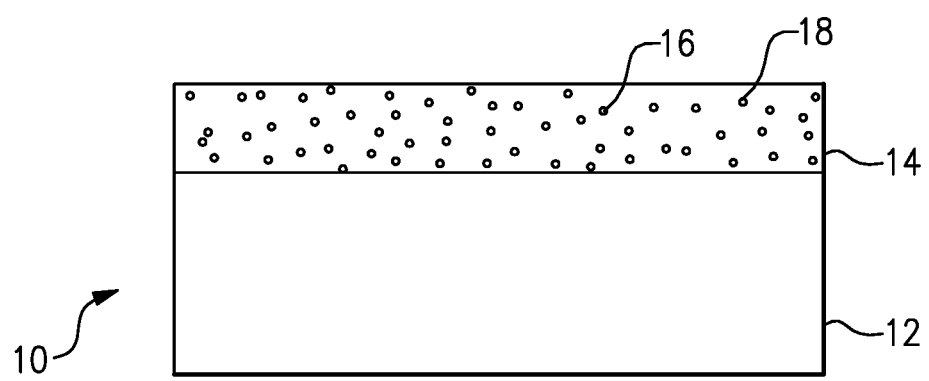
FIG. 1 illustrates an example corrosion resistant article.

FIG. 1 illustrates selected portions of an example corrosion resistant article 10, such as an aerospace component, or other type of article. In this example, the corrosion resistant article includes a substrate 12 and a protective coating 14 on the substrate 12. The protective coating 14 resists corrosion of the underlying substrate 12. Although a particular structure of the protective coating 14 and substrate 12 is shown in the disclosed example, it is to be understood that the disclosed configuration is not limited to the example shown and may include additional layers or coatings.

In this example, the substrate 12 is an aluminum alloy having a relatively high amount of zinc. For example, the aluminum alloy includes greater than 0.25 wt % zinc. In a further example, the aluminum alloy includes greater than about 5 wt % zinc. In yet a further example, the aluminum alloy includes about 5.1-6.1 wt % zinc. The term "about" as used in this description relative to numerical values such as compositions refers to possible variation in the value, such as normally accepted variations or tolerances in the art.

The composition of the protective coating 14, as will be described below, is selected to provide corrosion protection for the aluminum alloy substrate 12 having a relatively high amount of zinc. For example, tungsten may react with zinc at the surface of a zinc-containing substrate to the detriment of the corrosion protection of the coating. For alloys such as aluminum 2024, the amount of zinc is below 0.25 wt % and the amount of copper is above 3.0 wt %, which results in a copper-rich surface that is not susceptible to reaction between tungsten and zinc. However, with lower amounts of copper and higher amounts of zinc, such as in aluminum 7075, there is a zinc-rich surface that is susceptible to reacting with tungsten from a corrosion inhibitor. In the disclosed example, the protective coating 14 is tungstate-free and thereby the benefit of avoiding the reaction between the tungsten and zinc.

In one example, the aluminum alloy of the substrate 12 is aluminum 7075 and includes about 1.2-2.0 wt % copper, about 0.3 wt % manganese, about 2.1-2.9 wt % magnesium, about 0.4 wt % silicon, about 0.5 wt % iron, about 5.1-6.1 wt % zinc, about 0.18 to 0.35 wt % chromium, about 0.2 wt % titanium, and a balance of aluminum. The aluminum 7075 may include additional impurities or other elements that do not materially affect the properties of the alloy, or elements that are unmeasured or undetectable in the alloy. Likewise, the substrate 12 may be another type of high zinc aluminum alloy having greater than 0.25 wt % zinc.

In the illustrated example, the protective coating 14 includes a non-tungstate anodic corrosion inhibitor 16 and a cathodic corrosion inhibitor 18 that protects the underlying substrate 12 against corrosion. For example, the non-tungstate anodic corrosion inhibitor suppresses metal oxidation reactions, and the cathodic corrosion inhibitor 18 suppresses reduction reactions.

In one example, the non-tungstate anodic corrosion inhibitor includes at least one of a vanadate compound or a molybdate compound. In a further example, the non-tungstate anodic corrosion inhibitor is zinc molybdate. The cathodic corrosion inhibitor includes at least one element selected from the Group IIIB Periodic Table elements. In a further example, the cathodic corrosion inhibitor includes cerium. For example, the cerium is in the form of cerium citrate. In yet a further example, the non-tungstate anodic corrosion inhibitor 16 includes only zinc molybdate, and the cathodic corrosion inhibitor includes only the cerium citrate, which may ensure that other elements of unknown reactivity are not present within the protective coating 14.

The protective coating 14 may be used in any of a variety of different forms. For example, the non-tungstate anodic corrosion inhibitor 16 and the cathodic corrosion inhibitor 18 may be used as an additive or pigment in adhesives, paints, primers, sealants, or the like. In another example, the non-tungstate anodic corrosion inhibitor 16 and the cathodic corrosion inhibitor 18 are used as an additive in a conversion coating process for forming the protective coating 14. In one example, the non-tungstate anodic corrosion inhibitor 16 and the cathodic corrosion inhibitor 18 comprise about 1 to 50 wt % of the protective coating 14 with the remaining amount comprising a matrix surrounding the corrosion inhibitors 16 and 18.

Figure 2:
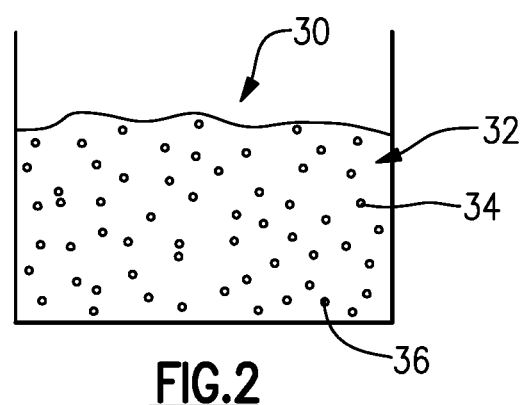
FIG. 2 illustrates an example corrosion-inhibiting substance for forming a protective coating.

Referring to FIG. 2, the protective coating 14 may be formed from a corrosion inhibiting substance 30 that is added to a primer, paint, adhesive, sealant, conversion coating, or used as a directly applied corrosion inhibitor, for example. The corrosion inhibiting substance 30 includes a carrier fluid 32, a cathodic corrosion inhibitor 34 within the carrier fluid 32, and a zinc-inert anodic corrosion inhibitor 36 within the carrier fluid. Depending upon the composition of the cathodic corrosion inhibitor 34, the zinc-inert anodic corrosion inhibitor 36, and the carrier fluid 32, the corrosion inhibitors 34 and 36 may exist as solid particles within the carrier fluid 32 or as dissolved substances within the carrier fluid 32.

In one example, the zinc-inert anodic corrosion inhibitor 36 is a corrosion inhibitor that is suitable for avoiding reaction with zinc when exposed to an aluminum alloy having greater than 0.25 wt % zinc. For example, the zinc-inert anodic corrosion inhibitor 36 includes a vanadate or molybdate compound. In a further example, the compound is zinc molybdate. The cathodic corrosion inhibitor 34 includes at least one element selected from the Group IIIB Periodic Table elements. In a further example, the cathodic corrosion inhibitor 34 includes cerium. For example, the cerium is in the form of cerium citrate.

The amounts of the cathodic corrosion inhibitor 34 and the zinc-inert anodic corrosion inhibitor 36 within the carrier fluid 32 depends upon the desired composition of the protective coating 14. In one example, the concentration of each of the corrosion inhibitors 34 and 36 within the carrier fluid is about 0.1 to 100 grams per liter (0.01-13.3 ounces per gallon) of the carrier fluid 32. Given this description, one of ordinary skill in the art will be able to determine suitable concentrations of the corrosion inhibitors 34 and 36 for forming the protective coating 14 with a desirable composition.

As indicated in the above examples, the corrosion inhibiting substance 30 is selected to include the non-tungstate anodic corrosion inhibitor 16 based upon the amount of the zinc within the aluminum alloy of the substrate 12. In one non-limiting example to demonstrate the effectiveness of the non-tungstate anodic corrosion inhibitor 16 on high zinc aluminum alloys, specimens of aluminum 2024 and 7075 were coated with various compositions of corrosion-inhibiting substances and subsequently evaluated for corrosion. The specimens were coated with one or more of three different corrosion inhibiting substances. As shown in Table 1 below, a cerium citrate cathodic inhibitor is indicated as inhibitor 1, a zinc molybdate anodic inhibitor is indicated as inhibitor 2, and a strontium tungstate anodic inhibitor is indicated as inhibitor 3. The specimens were then tested according to ASTM G85 Annex 5 and evaluated with a numerical rating between 1 and 10, where 10 indicates no corrosion and 0 indicates complete corrosive failure. In other examples, other test conditions or standards may be used.

As shown in Table 1, the corrosion-inhibiting combination of all three corrosion inhibitors provides a rating of nine for the 2024 alloy. However, the corrosion-inhibiting combination of all three corrosion inhibitors provides only a rating of six for protecting the 7075 alloy. In this test, the combination of the cerium citrate cathodic inhibitor 1 and the zinc molybdate anodic inhibitor 2 provided a rating of nine for the 2024 alloy and a rating of 8 for the 7075 alloy. Thus, the tungstate-containing combination protects the 2024 alloy but does not protect the 7075 alloy as well, whereas the tungstate-free combination provides corrosion protection for the 2024 alloy and the 7075 alloy.

TABLE 1

| Alloy | Inhibitor 1 + Inhibitor 2 | Inhibitor 1 + Inhibitor 2 + Inhibitor 3 |
|---|---|---|
| 2024 | 9 | 9 |
| 7075 | 8 | 6 |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A corrosion resistant article comprising:
    an aluminum alloy substrate having greater than 5 wt % zinc and 2 wt % or less of copper, the aluminum alloy substrate; and
    a layer in contact with the surface of the aluminum substrate, the layer including a non-tungstate anodic corrosion inhibitor and a cathodic corrosion inhibitor, non-tungstate anodic corrosion inhibitor including at least one of a vanadate compound or a molybdate compound and the cathodic corrosion inhibitor including a Group IIIB Periodic Table element.

2. The corrosion resistant article as recited in claim 1, wherein the aluminum alloy substrate includes 5.1-6.1 wt % of the zinc.

3. The corrosion resistant article as recited in claim 2, wherein the aluminum alloy substrate includes about 1.2-2 wt % of the copper.

4. The corrosion resistant article as recited in claim 3, wherein the aluminum substrate comprises manganese, magnesium, silicon, iron, chromium, and titanium.

5. The corrosion resistant article as recited in claim 4, wherein the aluminum alloy substrate comprises 2.1-2.9 wt % of the magnesium.

6. The corrosion resistant article as recited in claim 5, wherein the aluminum alloy substrate comprises 0.18-0.35 wt % of the chromium.

7. The corrosion resistant article as recited in claim 6, wherein the non-tungstate anodic corrosion inhibitor is zinc molybdate.

8. The corrosion resistant article as recited in claim 7, wherein the cathodic corrosion inhibitor is cerium citrate.

9. The corrosion resistant article as recited in claim 1, wherein the non-tungstate anodic corrosion inhibitor is zinc molybdate.

10. The corrosion resistant article as recited in claim 9, wherein the cathodic corrosion inhibitor is cerium citrate.

11. The corrosion resistant article as recited in claim 10, wherein the aluminum substrate comprises manganese, magnesium, silicon, iron, chromium, and titanium.

12. The corrosion resistant article as recited in claim 11, wherein the aluminum alloy substrate comprises 0.18-0.35 wt % of the chromium.

13. The corrosion resistant article as recited in claim 12, wherein the aluminum alloy substrate comprises 2.1-2.9 wt % of the magnesium.

14. The corrosion resistant article as recited in claim 13, wherein the aluminum alloy substrate includes 5.1-6.1 wt % of the zinc and the aluminum alloy substrate includes about 1.2-2 wt % of the copper.

15. A corrosion resistant article comprising:
    a substrate formed of aluminum 7075, the substrate having a surface; and
    a layer in contact with the surface of the aluminum substrate, the layer including a non-tungstate anodic corrosion inhibitor and a cathodic corrosion inhibitor, non-tungstate anodic corrosion inhibitor including a vanadate compound or a molybdate compound and the cathodic corrosion inhibitor including cerium citrate.

* * * * *